April 20, 1954    S. D. GUNNING    2,675,784
VALVE FOR ROCK DRILLS
Filed Jan. 2, 1952

*INVENTOR.*
SAMUEL D GUNNING
BY
ATTORNEY

Patented Apr. 20, 1954

2,675,784

UNITED STATES PATENT OFFICE 2,675,784

VALVE FOR ROCK DRILLS

Samuel D. Gunning, Cleveland Heights, Ohio, assignor, by mesne assignments, to Le Roi Company, a corporation of Delaware Application January 2, 1952, Serial No. 264,620

5 Claims. (Cl. 121—28)

This invention relates broadly to fluid actuated rock drills, but more particularly to a pressure fluid distributing automatic valve therefor.

One object of this invention is to produce a rock drill with an efficient motive fluid distributing valve, which is simple in construction and readily responsive to the action of the pressure fluid thereon.

Another object of this invention is to produce a valve for a rock drill capable of rapid and efficient distribution of the pressure fluid resulting in the fast and economical reciprocation of the rock drill piston.

Another object of this invention is to produce a valve for rock drills wherein the pressure fluid supply to the piston chamber is measured by means other than the space between the valve and its associated seats, thereby enabling normal seat wear to take place without affecting the pressure fluid consumption of the drills.

Other objects of this invention will be apparent from the following detailed description wherein similar characters of reference designate corresponding parts, and wherein.

Figure 1:
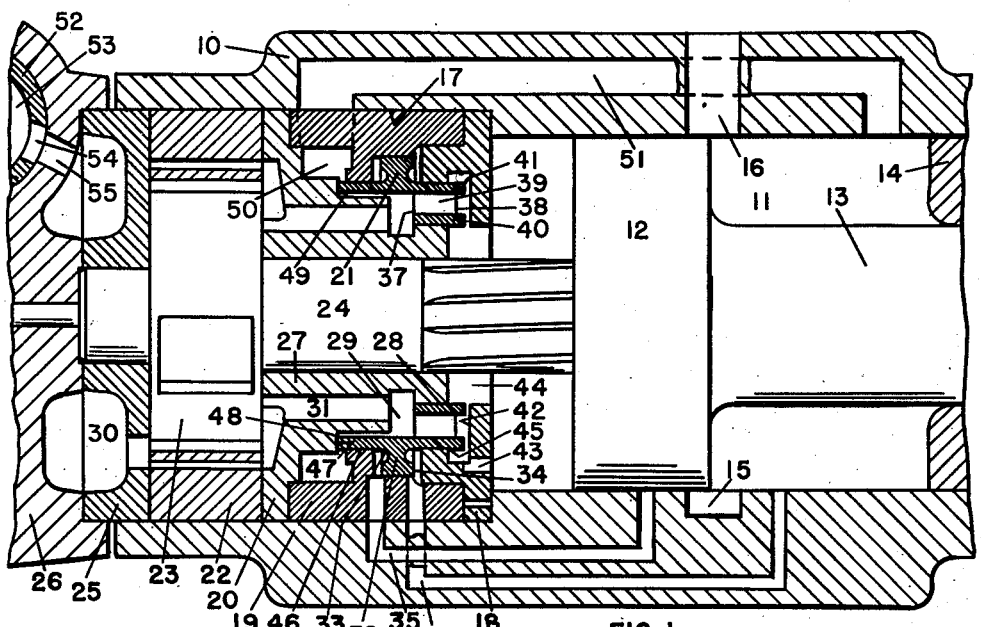
Figure 1 is a longitudinal sectional view of a portion of a rock drill embodying the invention.

Referring to the drawings, 10 represents a cylinder formed with a piston chamber 11 in which a piston 12 is capable of reciprocation. Piston 12 has a stem 13 engageable with a drill steel, not shown, to deliver impacts thereto, and is slidably guided in a front bushing or spacer 14. Intermediate its ends, the piston chamber 11 is provided with an exhaust groove 15 which opens into an exhaust port 16.

The rear end of cylinder 10 is provided with a flat bottom counterbore 17 accommodating a valve cap 18 which rests against the bottom thereof, a valve chest 19 and a valve bushing 20, which together form a valve housing having an annular valve 21 reciprocable therein. Also mounted in the counterbore 17, there is the ratchet ring 22 of a rotation mechanism which includes the head 23 of a rifle bar 24 extending through the valve housing into the piston 12 for imparting rotation thereto in the usual manner. The valve cap, valve chest and bushing together with the ratchet ring are held in the counterbore 17 against relative rotation by a key or dowel pin, not shown, and against lengthwise movement by a bearing plate 25 clamped against the ratchet ring by a back head 26 which is preferably bolted to the cylinder 10.

The valve bushing 20 closes one end of the valve chest 19 and has a cylindrical sleeve 27 surrounding the rifle stem 24 and near its free end forming an internal sliding bearing 28 for the valve 21. Externally, sleeve 27 is provided with an annular inlet groove 29 in constant communication with a supply chamber 30 through a system of ports 31.

The valve 21 is formed with an external annular flange 32 slidably engaging a corresponding inner wall of the chest 19 and having its sides forming opposed actuating areas 33 and 34. The area 33 is in constant communication with the piston chamber 11 through a kick port 35 which opens therein on one side of the exhaust groove 15, while a similar kick port 36 opens in the piston chamber on the other side of the exhaust groove 15 and leads to the actuating area 34. Internally, the valve is formed of two different diameters, resulting in two internal portions, one substantially larger than the other, and united by a relatively wide flat internal annular land 37 having pressure fluid supplied thereto through the bushing groove 29. From land 37, pressure fluid is conveyed to a front annular valve seat 42 provided on the cap 18 via equally spaced ports 39 extending through the valve and opening in an annular groove 38. This groove is cut in the end of the valve to provide two annular and concentric radially spaced valve ends or sealing surfaces 40 and 41 engageable with valve seat 42. From the front seat 42, pressure fluid may flow into the rear end of piston chamber 11 through inlet ports 43 controlled by the valve sealing surface 41 and through an enlarged inlet port or central bore 44 provided through valve cap 18 and controlled by valve sealing surface 40. Externally, the valve is slidably guided on the valve cap 18 as at 45 and in the chest 19 as at 46. The other annular end or sealing surface 47 of the valve is of a diameter and area substantially equal to its end 41, and is engageable with a rear annular valve seat 48 formed on the valve bushing 20. From the valve annular land 37, pressure fluid may flow through an annular clearance or passageway 49 provided between valve bushing 20 and the interior of the valve, over the end 47 of the valve into a relatively large annular groove 50, and therefrom to the front end of the piston chamber 11 through one or more inlet ports 51.

Rotatable within the head 26, there is a throttle valve 52 formed with a central inlet passage 53 and a radial port 54 capable of registration with a port 55 provided in the head 26 and opening into supply chamber 30.

In the operation of the tool, with the valve 21 and throttle valve 52 positioned as shown in Fig. 1, pressure fluid such as compressed air is supplied to the throttle valve central inlet passage 53 from any suitable source, such as an air compressor, and therefrom to the inlet chamber 30 via ports 54 and 55. From inlet chamber 30, pressure fluid is free to flow into inlet groove 29 through the system of ports 31, which system includes spaces generally provided between the rifle bar head 23 and its ring 22. From the valve internal annular land 37, which has pressure fluid supplied thereto through the groove 29, supply of pressure fluid to the rear end of piston chamber 11 takes place through the valve ports 39, valve groove 38, over the valve sealing surfaces 40 and 41 and through the inlet ports 43 and 44, while the supply of pressure fluid to the front end of piston chamber 11 is shut off by the valve end or sealing surface 47 engaging the valve rear seat 48. Pressure fluid thus admitted into the rear end of the piston chamber will act on the piston 12 to drive it forwardly and deliver impact to the drill steel. In this position of the valve, the unbalanced portion of its opened end becomes a holding area subjected to the action of the pressure fluid for temporarily holding the valve on the rear seat 48. As clearly shown in Figure 1, this unbalanced portion is limited to the area of the annular end 41, which is substantially equal to the area of the opposed end 47. As the piston 12 is driven forwardly, it will uncover the kick port 35 to admit pressure fluid on the valve actuating area 33 to shift the valve forwardly into engagement of its ends 40 and 41 with the valve front seat 42, thereby shutting off the supply of pressure fluid to the rear end of the piston chamber 11. Immediately before its impact on the drill steel, the piston 12 will also uncover the exhaust groove 15 to release the pressure fluid previously admitted into the rear end of the piston chamber.

Figure 2:
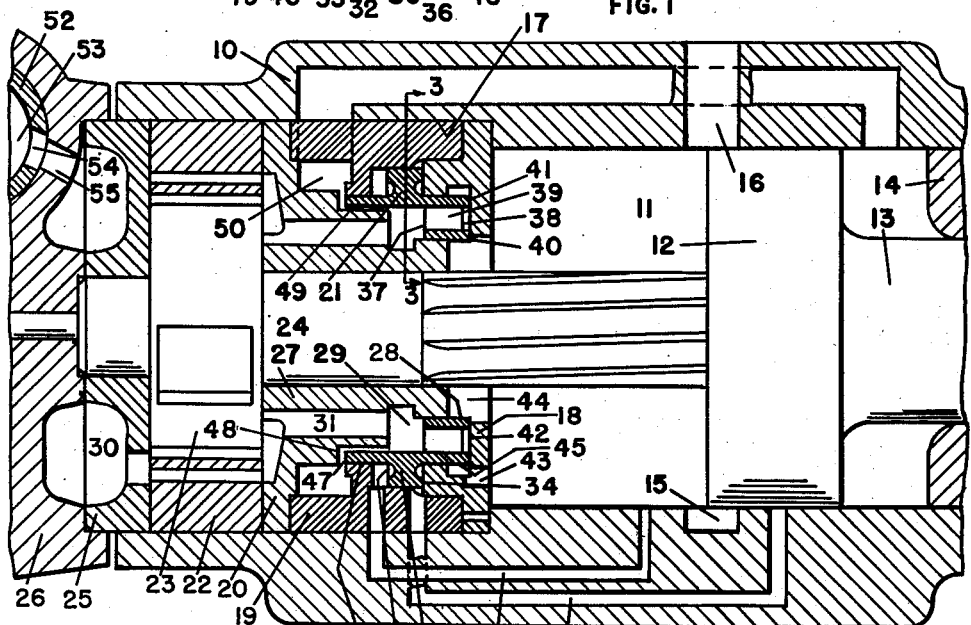
Figure 2 is a view similar to Figure 1, but showing some of the parts in different positions.
Figure 3:
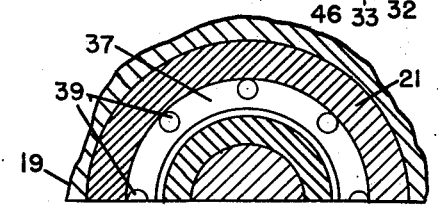
Figure 3 is a partial cross-sectional view taken on line 3—3 in Figure 2 and looking in the direction of the arrows.

With the automatic valve positioned as shown in Fig. 2, pressure fluid from the valve annular land 37 is free to flow therefrom into the front end of the piston chamber 11 via the annular passageway 49, valve seat 48, groove 50 and ports 51. In this instance, the area of the valve end 47 together with the unbalanced area of the valve annular land 37, which is equal to the area of the valve end 40, act as rear holding areas for holding the valve on the front seat 42. It will be understood that by providing the valve front groove 38, the rear holding areas, which otherwise would include the entire area of the land 37 less the combined area of the ports 39, are reduced to the area of valve end 47 and an area equal to that of valve end 40. Pressure fluid in the front end of piston chamber 11 will effect the rearward stroke of the piston 12, causing it to uncover kick port 36 and admit pressure fluid to the actuating area 34 for shifting the valve to the position shown in Figure 1. During its rearward stroke, piston 12 will also uncover exhaust groove 15 to release the pressure fluid previously admitted in the front end of chamber 11.

In the present construction, the amount of pressure fluid supplied to both ends of the piston chamber 11 is not controlled by the space between the ends of the valve and their respective seats, but in one instance by the size and number of ports 39 and in the other instance by the size of the annular passageway 49, thereby enabling the usual amount of seat wear to take place without affecting the pressure fluid consumption and drilling characteristics of the tool. In other words, the volumetric capacity of both valve openings is greater than that of the pressure fluid supplying means to the openings.

From the foregoing description, it will be understood that the automatic valve 21 is provided on one end with two annular sealing surfaces 40 and 41 engageable with a common valve seat 42 for shutting off supply of motive fluid to the rear end of chamber 11, and on the other end with one sealing surface 47 for shutting off supply of motive fluid to the front end of chamber 11.

It will also be understood that in order to assure proper engagement of the two valve sealing surfaces 40 and 41 with valve front seat 42, the valve is provided with two holding areas, one formed on the end 47 and the other formed by the unbalanced portion of the annular land 37, while proper engagement of the one valve sealing surface 47 with valve seat 48 is assured by the one holding area 40.

It will also be further understood that details of structure and rearrangement of parts shown and described may be variously changed and modified without departing from the spirit and scope of the invention.

I claim:

1. In a fluid actuated rock drill, a cylinder having a piston chamber and a piston reciprocable therein, an exhaust port for the piston chamber, a valve housing having opposed annular valve seats, an annular valve reciprocable in said housing having its ends engageable with said seats, inlet ports leading from said seats to said chamber, an internal annular land intermediate the ends of said valve having pressure fluid supplied thereto, an annular passageway between an internal portion of said valve and said housing to convey pressure fluid from said land to one of said seats, pressure fluid conveying ports through said valve leading from said land to the other of said seats, an external annular flange on said valve having opposed actuating areas intermittently exposed to pressure fluid controlled by said piston for actuating the valve and causing intermittent engagement of its ends with said seats to control supply of pressure fluid from said seats to said chamber via said inlet ports, and opposed holding areas on the ends of said valve intermittently exposed to pressure fluid from said seats for holding the valve.

2. In a fluid actuated rock drill, a cylinder having a piston chamber and a piston reciprocable therein, an exhaust port for the piston chamber, a valve housing having opposed annular valve seats, an annular valve reciprocable in said housing having ends of different areas engageable with said seats, inlet ports leading from said seats to said chamber, an internal annular land intermediate the ends of said valve having pressure fluid supplied thereto, said valve being internally larger on one side of said land than on the other to form with said housing an annular passageway to convey pressure fluid from said land to one of said seats, pressure fluid conveying ports through said valve leading from said land to the other of said seats, an external annular flange on said valve having opposed actuating areas intermittently exposed to pressure fluid controlled by said piston for actuating the valve and causing intermittent engagement of its ends with said seats to control supply of pressure fluid from said seats to said chamber via said inlet ports, and opposed holding surfaces on the ends of said valve of equal effective areas intermittently exposed to pressure fluid from said seats for holding the valve.

3. In a fluid actuated rock drill, a cylinder having a piston chamber and a piston reciprocable therein, an exhaust port for the piston chamber, a valve housing having opposed annular valve seats, an annular valve reciprocable in said housing, a sealing surface on one end thereof engageable with one of said seats and a duality of concentric radially spaced sealing surfaces on the other end thereof engageable with the other of said seats, inlet ports leading from said seats to said chamber, an internal annular land intermediate the ends of said valve having pressure fluid supplied thereto, said valve being internally larger on one side of said land than on the other to form with said housing a pressure fluid conveying annular passageway leading from said land to one of said seats, pressure fluid conveying ports through said valve leading from said land to the other of said seats and opening between said concentric sealing surfaces, an external annular flange on said valve having opposed actuating areas intermittently exposed to pressure fluid controlled by said piston for actuating the valve and causing intermittent engagement of said sealing surfaces with their respective seats to control supply of pressure fluid from said seats to said chamber via said inlet ports, and opposed means on said valve intermittently exposed to pressure fluid for holding said valve on one or the other of said seats, said means including a holding area for holding said valve on one of said seats and a duality of holding areas including a portion of said annular land for holding said valve on the other seat.

4. In a fluid actuated rock drill, a cylinder having a piston chamber and a piston reciprocable therein, an exhaust port for the piston chamber, a valve housing having opposed annular valve seats, an annular valve reciprocable in said housing having its ends engageable with said seats, inlet ports leading from said seats to said chamber, an internal annular land intermediate the ends of said valve having pressure fluid supplied thereto, an annular clearance between the interior of said valve and said housing to convey pressure fluid from said land to one of said seats, pressure fluid conveying ports through said valve leading from said land to the other of said seats, an external annular flange on said valve having opposed actuating areas intermittently exposed to pressure fluid controlled by said piston for actuating the valve and causing intermittent engagement of its ends with said seats to control supply of pressure fluid from said seats to said chamber via said inlet ports, the amount of pressure fluid supplied to said chamber being governed by the volumetric capacity of said clearance and pressure fluid conveying ports, and opposed holding areas on the ends of said valve intermittently exposed to pressure fluid from said seats for holding the valve.

5. In a fluid actuated rock drill, a cylinder having a piston chamber and a piston reciprocable therein, an exhaust port for the piston chamber, a valve housing having opposed front and rear annular valve seats, an annular valve reciprocable in said housing having its ends engageable with said seats, inlet ports leading from said seats to said chamber, said valve having two internal portions of different diameters forming at their junction an internal annular land, means including a system of ports through said housing supplying pressure fluid to said land, an annular passageway between one of said portions and said housing conveying pressure fluid from said land to said rear seat, pressure fluid conveying ports through said valve leading from said land to said front seat, an external annular flange on said valve having opposed actuating areas intermittently exposed to pressure fluid controlled by said piston for actuating the valve and causing intermittent engagement of its ends with said seats to control supply of pressure fluid from said seats to said chamber via said inlet ports, and opposed holding areas on the ends of said valve intermittently exposed to pressure fluid from said seats for holding said valve.

References Cited in the file of this patent

UNITED STATES PATENTS

| Number | Name | Date |
|---|---|---|
| 2,048,957 | Smith, Sr., et al. | July 28, 1936 |
| 2,448,875 | Fossum | Sept. 7, 1948 |